Dec. 23, 1941. P. HIRSCH ET AL Re. 21,984

PIPE COUPLING

Original Filed Sept. 22, 1936 2 Sheets-Sheet 1

INVENTORS:
Peter Hirsch
BY Rudolf Kaiser
E. A. Uhm.
AGENT.

Dec. 23, 1941. P. HIRSCH ET AL Re. 21,984

PIPE COUPLING

Original Filed Sept. 22, 1936 2 Sheets-Sheet 2

Inventors:
Peter Hirsch
Rudolf Kaiser

By E. A. Ohm.

AGENT.

Reissued Dec. 23, 1941

Re. 21,984

UNITED STATES PATENT OFFICE 21,984

PIPE COUPLING

Peter Hirsch, New York, N. Y., and Rudolf Kaiser, Hohenneuendorf, near Berlin, Germany, assignors to Michigan Patents Corporation, Jackson, Mich.

Original No. 2,108,714, dated February 15, 1938, Serial No. 102,023, September 22, 1936. Application for reissue April 20, 1940, Serial No. 330,776. In Germany September 28, 1935

6 Claims. (Cl. 284—18)

This invention relates to fluid operated brakes which are incorporated into the vehicle wheels and more particularly to pipe couplings for brakes of this type.

Liquid operated brakes for wheels of vehicles heretofore have been exclusively constructed so that the wheel body had to be separated from the brake, if the wheel was to be removed e. g. for the repair of the tire and it was only necessary to take the wheel body off the axle leaving the brake casing together with its liquid carrying conduits, untouched. This design has been developed and is in general use with automobiles, because the removal of the brake would require disconnecting the latter from the pipes or conduits carrying the liquid and serious difficulties would arise when such a removal and reassembly becomes necessary on account of the time consuming refilling and priming of the brake system due to a loss of liquid in the fluid system or due to the inclusion of air in the system.

At present all brakes for the wheels of vehicles are constructed in a manner which may best be explained, by way of example, in connection with the wheels of an aircraft because in this case the most difficult operating conditions prevail. Owing to the constantly increased flying speed of aircrafts the landing speed also is increased in the same proportion and it is practically impossible to compensate the increased landing speed by longer run outs. Therefore, the brake has to absorb the increased kinetic energy, i. e. such energy must be converted into heat and the heat must be absorbed and dissipated. The enlargement of the brake itself is limited on account of the space available within the wheel and the increased amount of heat developed endangers the safety of operation because an increased amount of heat, on the one hand, may lead to a destruction of the brake lining respectively of the braking surfaces and, on the other hand, may damage the tire. In fact, an improved brake for the wheels of aircraft represents one of the most important problems in the further development of aircraft.

What has been mentioned above in connection with the brakes of the wheels of an aircraft is also true for liquid operated brakes of other fast vehicles, as the difficulties encountered in braking such vehicles are the same as for aircrafts.

The present invention is based upon the knowledge that the efficiency of a brake of given weight and dimensions can be increased only if the hitherto exclusively used construction of wheels separated from the brakes is abandoned and both elements are combined to one unit. In a brake of the type referred to the material of the brake casing may be simultaneously used for carrying the load, i. e. for strengthening the wheel body, whereas, on the other hand, the wheel body is utilized for absorbing and dissipating the heat created during the braking operation whereby a considerable increase of the total surface available for dissipation and cooling is ensured without increase of weight.

Our new wheel and brake design has been made possible by the utilization of a self sealing pipe coupling provided in each pipe carrying brake fluid to the vehicle wheels. Both coupling parts of the coupling are equipped with an automatically acting self sealing valve positively held open if the coupling is connected and being automatically closed if the coupling is disconnected. Pipe couplings of the kind referred to are known per se but heretofore the advantage of the use of such pipe couplings and its effect on the design of vehicle wheels provided with liquid operated brakes has not been recognized.

In fact it is the present invention which first allowed the development of a combined wheel and brake design and thereby led to wheels with brakes of equal weight and dimension and with greatly increased brake capacity as compared with those of prior design.

Accordingly, it is among the objects of the invention to provide a fluid operated brake which is incorporated in the wheel of a vehicle.

Another object of the invention is to provide a self sealing coupling for the conduit of the fluid operating the brake of the wheel.

A further object of the invention is to provide a self sealing coupling with valves positively held open when the coupling is connected and which are closed automatically when the coupling is disconnected.

These and other objects of the present invention will become more evident in the following description taken in connection with the drawings, in which.

Figure 3:
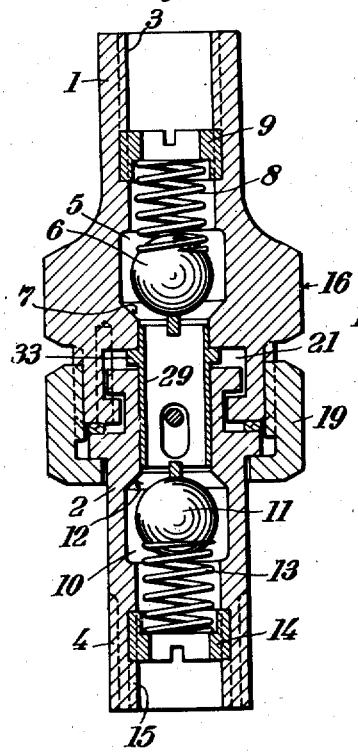
Fig. 3 shows a cross-section through the coupling according to the invention in the coupled state.
Figure 4:
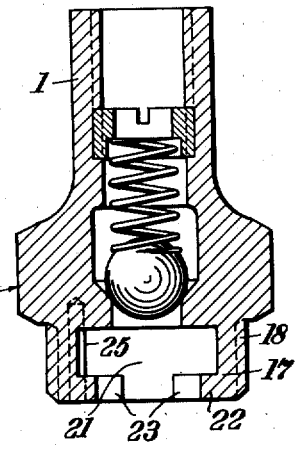
Figure 5:
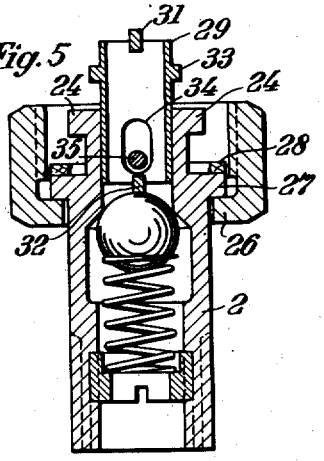
Figure 6:
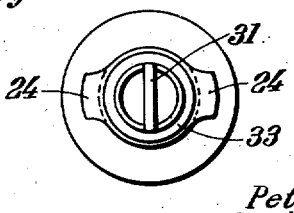

Fig. 4 a cross-section similar to Fig. 3, but through one coupling part in the uncoupled state;

Fig. 5 is a cross-section similar to Fig. 4 through the other coupling part;

Fig. 6 is a plan view of detail.

Figure 1:
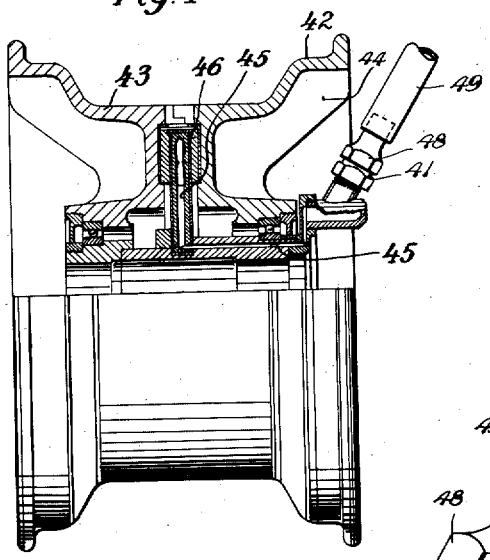
Fig. 1 is a section along line 1—1 of Fig. 2 showing a brake and wheel unit.
Figure 1A:
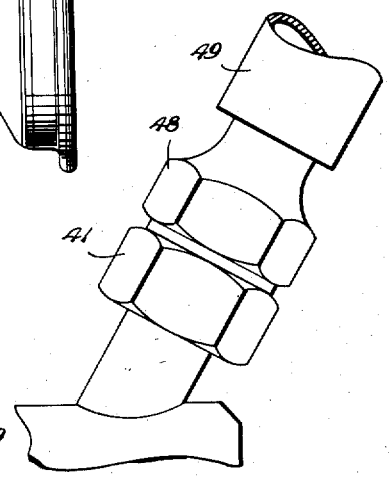
Fig. 1A is a fragmentary view of a detail of Fig. 1 illustrating the assembled coupling together with the brake fluid conducting hose and a portion of the wheel body.
Figure 2:
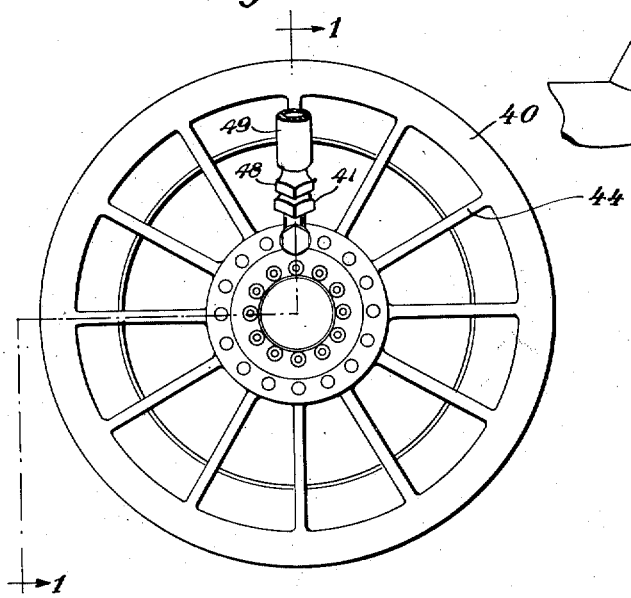
Fig. 2 is a plan view of the assembly shown in Fig. 1.

Referring to Figs. 1 and 2, wheel 40 comprises two substantially equal halves 42 and 43 connected together e. g. by screw bolts. The coupling for the fluid conduit 45 is generally designated 41. Coupling 41 is shown in greater detail in Figs. 3 to 6. The two halves 42 and 43 of the wheel body are provided with ribs 44 to reinforce the wheel body. The fluid in conduit 45 operates the brake generally designated 46 which may be of any known construction. Brake 46 forms a unit with the wheel 40.

As shown in Figs. 3 to 6 the coupling consists of a socket-like part 1 and a spigot-like part 2, which are fixed to the ends of the pipes to be connected, which are not shown. Fixing can for instance be effected by means of the internal thread 3 provided in the coupling part 1 and with the coupling part 2 by means of the external thread 4.

The coupling part 1 has a chamber 5 for the reception of the ball 6. 7 is the seating surface for the ball, which co-acts with the ball and, on the ball bearing against it, provides a tight closure. The ball is under the influence of a compression spring 8 which is held by means of a nut 9 screwed into the internal thread 3. Similarly, in the coupling part 2 there is a chamber 10 with a ball 11, the sealing surface 12 for the latter, the compression spring 13 and a nut 14 which is screwed into the internal thread 15.

The connection of the two coupling parts 1 and 2 is effected as follows:

The coupling part 1 is provided with an engagement surface 16 which allows of the coupling part being held to prevent turning, for instance by means of a spanner, a clamp or the like. In the example shown, this engagement surface 16 is formed as a hexagon, but in some circumstances a fluted cylindrical surface will suffice. Below this surface 16 the coupling part 1 is provided with an extension 17 (Fig. 4), which has an external thread 18 for screwing on the cap nut 19. The space within the coupling part 1 widens out behind the valve seating 7, so as to form a chamber 21, the purpose of which will be described below. The extension 17 is made of somewhat smaller diameter at its lower end, so that an annular flange 22 is formed. In this flange two oppositely disposed slots 23 are provided, for the bayonet-like engagement of the lateral projections 24 at the end of the coupling part 2. When the coupling part 1 (Fig. 4) is to be connected with the coupling part 2 (Fig. 5), the part 1 is held at the periphery 16 to prevent it turning, for instance by means of a spanner. The projections 24 of the coupling part 2 are pushed into the bayonet catch 23 and are turned in the chamber 21 until the stop 25 is reached, which is a pin introduced into a bore in the coupling part 1. The cap nut 19 is then screwed on to the thread 18, engaging by means of its bottom internal flange 26 in the external flange 27 of the part 2 and pressing part 2 against the part 1. On the surface of the external flange 27 which faces the coupling part 1, a packing ring 28 is provided.

In Figs. 4 and 5 is shown that, when the coupling is released, the balls will bear on their seatings under the pressure of their associated springs, so that the two pipes are closed to the outside.

On the two coupling parts being connected, the balls are lifted from their seatings. For this purpose a small tubular piece 29 is inserted into the end of the opening of the coupling part 2, which is behind the ball chamber 10 of the latter. This tubular piece 29 has two bridges 31 and 32, which, when the two coupling parts are united, lift the two balls from their seatings and hold them in this position, as shown in Figure 3. As the stressing of the springs 8 and 13 may be different or as there may be pressure differences in the pipes behind the coupling parts 1 and 2, the tubular piece 29 might be displaced by one ball or the other in the axial direction, which might lead to one of the valves closing, if safety means for preventing this were not provided. These safety means consist in an outer ring flange 33 which, as shown in Fig. 3, can bear, or bears, on the one hand against an internal surface of the coupling part 1, in the chamber 21, and on the other hand against the end edge of the flange 24 of the coupling part 2.

On the two coupling parts being separated, the tubular piece 29 will be displaced under the pressure of the ball 11, as its bridge 31 is no longer under the pressure of the ball 6, towards the bridge 32. In order to prevent the tubular piece from falling out altogether, its cylindrical surface is slotted at 34 and in this slot there engages a pin 35 provided in the coupling part 2.

In the coupled state (Fig. 3), the two balls are therefore lifted off their seatings 7 and 12. As, when the cap nut 19 is gradually released, the packing 28 is loosened, but the balls 6 and 11 are still lifted off their seatings, liquid from the pipe might leak out over the packing 28. In order to prevent this, the tubular piece 29 is accurately fitted in the ends of the coupling parts 1 and 2.

What we claim is:

1. A pipe coupling comprising two coupling parts, in each coupling part a valve, means for keeping the valves closed, when the coupling is disconnected, a tubular piece overlapping both ends of the coupling parts and disposed between the two valves for keeping the valves open, when the coupling is connected, and a flange on the tubular piece, adapted to bear against the ends of the coupling parts for securing them against axial displacement.

2. The device as claimed in claim 1 in which the tubular piece is located between the two valves and the means for fixing said tubular piece in position is a flange thereon adapted to bear against the ends of the axial part.

3. The device as claimed in claim 1 in which the tubular piece is located between the two valves and the means for fixing said tubular piece in position is a flange thereon adapted to bear against the ends of the axial part, and means in one of said coupling parts to retain said tubular piece therein when the coupling is disconnected.

4. The device as claimed in claim 1 in which the tubular piece is located between the two valves and the means for fixing said tubular piece in position is a flange thereon adapted to bear against the ends of the axial part, said tubular piece fitting slidingly and tightly in said coupling and adapted to act as a sealing means during the disconnecting of the coupling parts before the closing of the valves.

5. The device as claimed in claim 1 in which the tubular piece is located between the two valves and the means for fixing said tubular piece in position is a flange thereon adapted to bear against the ends of the axial part, said tubular piece fitting slidingly and tightly in said coupling and adapted to act as a sealing means during the disconnecting of the coupling parts before the closing of the valves, and in which there are further sealing means between the ends of the two coupling parts.

6. In a demountable wheel and brake assembly, a fluid brake device comprising relatively rotatable brake parts, a fluid brake operatively associated with said brake parts, one of said brake parts being stationary relatively to the wheel axle, a fluid supply conduit, a pipe coupling connecting said conduit and said stationary brake part, said coupling including separable coupling parts one of which is connected to said stationary brake part and the other to said supply conduit, and a valve in each of said coupling parts, each valve being held open when the parts are coupled and being adapted to close automatically when the parts are separated, whereby the brake fluid is retained in the brake device as well as in the conduit upon separation of the coupling and removal of the wheel from the axle.

PETER HIRSCH.
RUDOLF KAISER.